US008538242B2

(12) United States Patent
Yeh, Jr.

(10) Patent No.: US 8,538,242 B2
(45) Date of Patent: Sep. 17, 2013

(54) COMPRESSED TIME INGESTION OF RECORDED VIDEO

(75) Inventor: Frank Yeh, Jr., Santa Ana, CA (US)

(73) Assignee: International Business Machines Corporation, Armonk, NY (US)

( * ) Notice: Subject to any disclaimer, the term of this patent is extended or adjusted under 35 U.S.C. 154(b) by 1324 days.

(21) Appl. No.: 12/191,063

(22) Filed: Aug. 13, 2008

(65) Prior Publication Data
US 2010/0040341 A1 Feb. 18, 2010

(51) Int. Cl.
*G11B 27/00* (2006.01)

(52) U.S. Cl.
USPC .......................................... 386/278; 386/239

(58) Field of Classification Search
USPC ................................................ 386/239, 278
See application file for complete search history.

(56) References Cited

U.S. PATENT DOCUMENTS

| | | | | |
|---|---|---|---|---|
| 6,360,234 | B2 * | 3/2002 | Jain et al. ....................... | 715/201 |
| 2008/0270569 | A1 * | 10/2008 | McBride et al. .............. | 709/217 |
| 2009/0158367 | A1 * | 6/2009 | Myers et al. ................... | 725/109 |
| 2010/0039564 | A1 * | 2/2010 | Cui et al. ....................... | 348/700 |

OTHER PUBLICATIONS

Rui, Yong, Ziyou Xiong, Regunathan Radhakrishnan, Ajay Divakaran, and Thomas S. Huang. "A unified framework for video summarization, browsing and retrieval." Mitsubishi Electric Research Laboratory Technical Report (2004).*

* cited by examiner

*Primary Examiner* — Thai Tran
*Assistant Examiner* — Tracy Mangialaschi
(74) *Attorney, Agent, or Firm* — Yudell Isidore Ng Russell PLLC

(57) ABSTRACT

Disclosed are systems, methods, and computer programs for processing recorded digital video content in massively parallel computing networks. In one embodiment, a disclosed method of processing recorded digital video content includes receiving a video clip, dividing the video clip into a plurality of video clip segments, and scheduling each video clip segment for processing. The method further includes time stamping each of the video clip segments with an appropriate time offset, determining an available analytics engine and an available ingestion engine from a set of analytics engines and ingestion engines in a massively parallel computing network, and commanding said available analytics engine and said available ingestion engine to, respectively, analyze and ingest a specific video clip segment using at least in part the time offset to index metadata generated by the analytics engine and ingestion engine.

21 Claims, 5 Drawing Sheets

COMPRESSED TIME INGESTION OF RECORDED VIDEO

BACKGROUND

1. Technical Field

The present invention generally relates to digital video data processing, and particularly the invention concerns systems and methods for analysis and ingestion of digital video content in massively parallel computing environments.

2. Description of the Related Art

Systems and techniques are known for processing recorded digital video content ("video") and producing metadata to facilitate searching the video to find information of interest. This type of processing of video typically involves the use of analytics engines and ingestion engines. An analytics engine processes video based on an analytics profile to produce metadata about the video. An ingestion engine receives the metadata, indexes it, and stores it in a database. The desired granularity and/or quality of video analysis determine the resulting requirements for bandwidth, processing, and storage. Frequently, a problem of resource scarcity arises when performing fine-grained analysis and ingestion of video.

Typically, there is a trade-off between said resource requirements and the granularity and/or quality of the events detected as the video is recorded. Of course, resource costs are minimized when a video processing system is configured to deliver the low levels of granularity and/or quality sufficient for routine operations. Hence, users are put in a position of either not having adequate granularity and/or quality for post-event searching of the video or expending excessive network, computer, and storage resources to process real time video (much of which will be never searched) at high levels of granularity and/or quality. However, when an event of interest occurs and additional information from the video is sought, it is desirable to have the capability to search the recorded video at high levels of granularity.

It is preferable that post-event analysis and ingestion of video be both fast and fine-grained. The more rapidly analysis and ingestion can be completed, the sooner searches can begin and reactive measures can be implemented. Analysis and ingestion of video with the inventive systems and methods disclosed herein enhances the types and speed of video processing available for searching video content.

SUMMARY OF ILLUSTRATIVE EMBODIMENTS

Disclosed are systems, methods, and computer programs for processing recorded digital video content in massively parallel computing networks. Embodiments of the invention, being configured to employ massively parallel computing facilities, allow for processing of video in a much shorter time than is possible with known technology. Additionally, the use of massively parallel computing facilities and corresponding, suitably adapted video processing techniques, provide for fine grained analysis of video in shorter times than known video processing technologies.

In one embodiment, the invention concerns a method of processing recorded digital video content. The method includes receiving a video clip, dividing the video clip into a plurality of video clip segments, and scheduling each video clip segment for processing. The method further includes time stamping each of the video clip segments with an appropriate time offset, determining an available analytics engine and an available ingestion engine from a set of analytics engines and ingestion engines in a massively parallel computing network, and commanding said available analytics engine and said available ingestion engine to, respectively, analyze and ingest a specific video clip segment using at least in part the time offset to index metadata generated by the analytics engine.

In one aspect the invention concerns a system for processing digital recorded video. The system includes a video divider that receives video content and divides said video content into smaller video segments, a plurality of analytics engines available on a massively parallel computing network, the analytics engines configured to analyze the video segments and generate metadata, and a plurality of ingestion engines available on said massively parallel computing network, the ingestion engines configured to receive and store the metadata in a database. The system further includes a post-event ingestion component configured to determine an appropriate time offset for each video segment, and provide said time offset to the analytics engines so that the metadata produced can be suitably indexed by the ingestion engines.

The above as well as additional features and advantages of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF ILLUSTRATIVE EMBODIMENTS

Figure 1:
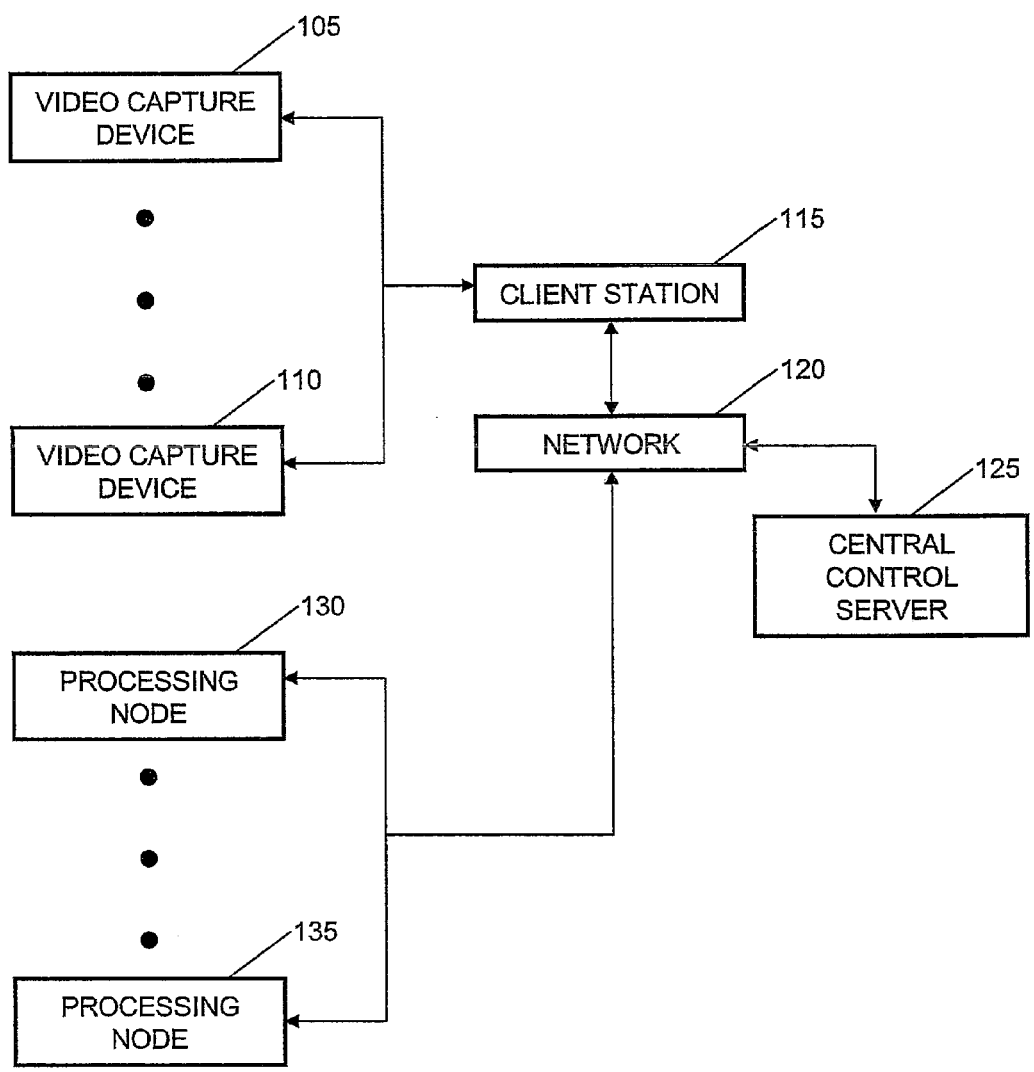
FIG. 1 is a high level schematic diagram of a networked computing environment configured for processing video in accordance with various embodiments of the invention.

The illustrative embodiments provide methods, systems, and computer programs for processing recorded digital video content in massively parallel computing networks.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). The specific numerals assigned to the elements are provided solely to aid in the description and not meant to imply any limitations (structural or functional) on the invention.

It is understood that the use of specific component, device and/or parameter names are exemplary only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, as utilized herein, the term "granularity" refers to the density of metadata. That is, the greater the metadata available for a given video, the greater the granularity. As used here, the term "quality" when applied to video refers to the level of density of digital data associated with a video. For example, the greater the resolution of the video images, the greater the quality.

Embodiments of the invention, address some or all of the resource scarcity challenges faced by the industry. As previously discussed, users are typically faced with having video processing resources that are affordable but provide only low level granularity of analysis, or having high cost video processing resources that provide high levels of granularity but which are mostly underutilized because the need for high quality and granularity of analysis is only periodic.

To address these challenges, embodiments of a system and method for reducing video processing time divide recorded video into separate segments that are subsequently analyzed and ingested in parallel. This allows temporary application of resources on a massive scale for rapidly processing the video. After the video is processed, search and access can proceed, at which point the resource requirement is reduced and the temporary resource is removed. Hence, in some circumstances, users are able receive the benefits of high performance video processing resources on an on-demand, or as needed, basis but only pay for the temporary use of the resource, rather than maintaining a high cost, permanent and underutilized resource.

To deliver these benefits, some embodiments of the invention generate metadata that is indexed with a time offset against the recorded video, which in turn has a time offset from the real time at which the video was recorded. The event information is stored in a transactional database, while the original recorded video remains in place and can be referenced by search. This allows something akin to a buffering of the recorded video for post-event processing, and also facilitates retaining an accurate reference to real time.

In some embodiments of the inventive video processing methods and systems, a video master is divided into video segments using analytics. The video segments are distributed to multiple analytics and ingestion engines for processing. A component for scheduling and distributing the video segments amongst the available analytics and ingestion engines is provided. In one embodiment, a video processing system and method divides compressed video at keyframes, which are frequently used in digital video compression algorithms. The system divides a single video clip into multiple logical clips using the keyframes as separation points. The time offset of each keyframe from the start of the video clip allows all of the divisions to be in synchronization relative to the master video. It should be noted that the latter embodiment adds a level of parallelism over the former embodiment by dividing the video clip into smaller video segments.

Turning to a detailed description and referencing FIG. 1 now, there is depicted a schematic representation of a networked computing environment suitable for processing video in accordance with various embodiments of the invention disclosed herein. In one embodiment, multiple video capture devices 105-110 are in communication with client station 115. Video capture devices 105-110 can be one or more of various, for example, well known video cameras, scanners, etc. Client station 115 can be a computing device such as data processing system 200 illustrated in FIG. 2. As will be further discussed below, client station 115 can include some or all of the components of the data processing system 200. Client station 115 is in communication with computer network 120. In one embodiment, computer network 120 is the well-known Internet, which is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example. The depicted example is not meant to imply any specific architectural or network limitations with respect to the present invention.

Central control server 125 is in communication with client station 115 and distributed processing nodes 130-135 via the network 120. Central control server 125 can be a computing device such as data processing system 200 illustrated in FIG. 2. Depending on the specific implementation, central control server 125 can include all or some of the components of data processing system 200. As will be described further below, in one embodiment, central control server 125 is provided with various hardware and/or software components to facilitate remote processing of video data captured by video capture devices 105-110. Processing nodes 130-135 can be computing devices in, for example, a grid computing environment or a massively parallel computing environment. Depending on the specific implementation, one or more of the processing nodes 130-135 can be data processing system 200, incorporating some or all of the components illustrated in FIG. 2.

In one implementation, video capture devices 105-110 capture video data and, with or without some processing of the video data, transmit the video data to client station 115. Client station 115 can be configured to apply some processing to the video data, including applying an encoder to raw video data to produce recorded digital video content ("video"). Client station 115 can also be configured to apply basic analytics to the video. In other embodiments, client station 115 merely facilitates the transmission of the video to central control server 125 via network 120. In one embodiment, central control server 125 is configured so that under certain circumstances, for example, when an event is detected and searching is desired, central control server 125 manages the processing of the video in concert with client station 115 and/or processing nodes 130-135 via the network 120. Some of these configurations and processing functionalities of the networked, digital video processing environment, client station 115, central control server 125, and/or processing nodes 130-135 will be discussed in further detail with reference to FIG. 3-FIG. 6.

Figure 2:
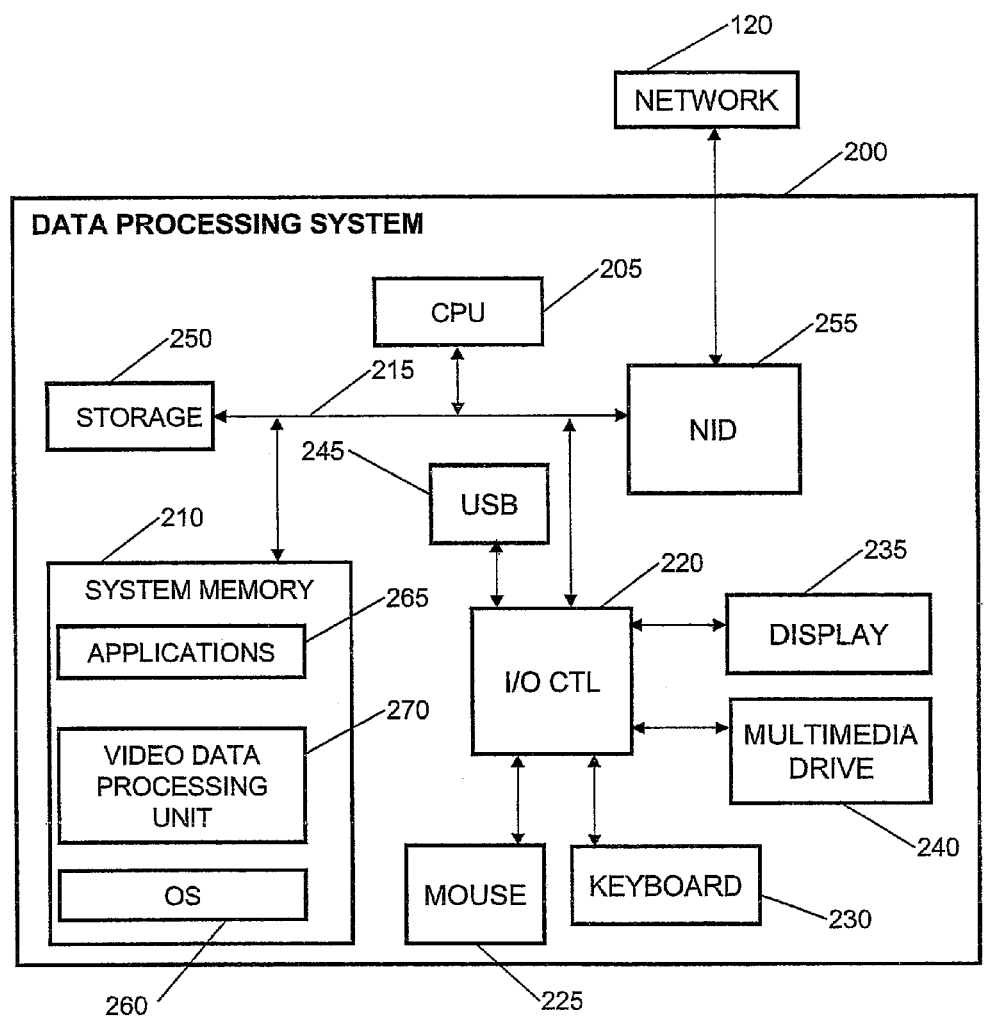
FIG. 2 is a block diagram of a data processing system that can be used with various computing components shown in FIG. 1.

Turning to FIG. 2 now, a block diagram of a data processing system 200 is depicted. In one embodiment, data processing system 200 includes at least one processor or central processing unit (CPU) 205 connected to system memory 210 via system interconnect/bus 215. System memory 210 is a lowest level of memory, and may include, for example, DRAM, flash memory or the like. Of course, data processing system 200 may include additional volatile memory, including, but not limited to, cache memory, registers, and buffers. Also connected to system bus 215 is I/O controller 220, which provides connectivity and control for input devices, of which pointing device (or mouse) 225 and keyboard 230 are illustrated, and output devices, of which display 235 is illustrated. Additionally, a multimedia drive 240 (for example, CDRW or DVD drive) and USB (universal serial bus) hub 245 are illustrated, coupled to I/O controller 220. Multimedia drive 240 and USB hub 245 may operate as both input and output (storage) mechanisms. Data processing system 200 also comprises storage 250, within which data/instructions/code may be stored. Data processing system 200 is also illustrated with network interface device (NID) 255 coupled to system bus 215. NID 255 enables data processing system 200 to connect to one or more access networks, such as network 120.

Notably, in addition to the above described hardware components of data processing system 200, various features can be completed via software (or firmware) code or logic stored within system memory 210 or other storage (for example, storage 250) and executed by CPU 205. In one embodiment, data/instructions/code from storage 250 populates the system memory 210, which is also coupled to system bus 215. Thus, illustrated within system memory 210 are a number of software/firmware components, including operating system (OS) 260 (for example, Microsoft Windows®, a trademark of Microsoft Corporation, or GNU®/Linux®, registered trademarks of the Free Software Foundation and The Linux Mark Institute, or Advanced Interactive eXecutive (AIX), registered trademark of International Business Machines Corporation), applications 265, and video data processing component 270.

In actual implementation, applications 265 and video data processing component 270 may be combined as a single application collectively providing the various functions of each individual software component when the corresponding code is executed by CPU 205. For simplicity, video data processing component 270 is illustrated and described as a stand alone or separate software/firmware component, which is stored in system memory 210 to provide/support the specific novel functions described herein. In actual implementation, components or code of OS 260 may be combined with that of video data processing component 270, collectively providing the various functional features of the invention when the corresponding code is executed by CPU 205.

CPU 205 executes video data processing component 270 as well as OS 260, which supports the user interface features of video data processing component 270. In some embodiments, video data processing component 270 generates/provides several graphical user interfaces (GUI) to enable user interaction with, or manipulation of, the functional features of video data processing component 270. It should be noted that depending on the specifics of any given configuration each of client station 115, central control server 125, and/or processing nodes 130-135 can be provided with a general computing architecture based on data processing system 200. However, the hardware and/or software functionality comprised by video data processing component 270 can be different for each of client station 115, central control server 125, and processing nodes 130-135. As will be particularly described below, in one embodiment, central control server 125 is provided with a video data processing component 270 that provides the functionality of a master process for managing video processing in the networked environment shown in FIG. 1. Among exemplary software code/instructions provided by video data processing component 270 are program code for: (a) dividing video into separate video segments; (b) time stamping each of the video segments with an appropriate time offset; (c) scheduling each video segment for processing; (d) determining which analytics and ingestion engines are available in a grid computing environment or a massively parallel computing environment; and (e) commanding the available analytics and ingestion engines to analyze and ingest the specific video segment. Depending on the specific embodiment, video data processing component 270 can include some or all of the listed code functions (a)-(e). Additionally, video data processing component 270 can include program code for other video processing functionality further discussed below. For simplicity of the description, the collective body of program code that enables these various features is referred to herein as video data processing component 270. According to the illustrative embodiment, when CPU 205 executes video data processing component 270, data processing system 200 initiates a series of processes that enable the above functional features as well as additional features/functionality, which are described below within the description of FIGS. 3-6.

Those of ordinary skill in the art will appreciate that the hardware and basic configuration depicted in FIGS. 1-2 may vary. For example, other devices/components may be used in addition to or in place of the hardware depicted. The depicted example is not meant to imply architectural limitations with respect to the present invention. The data processing system depicted in FIGS. 1-2 can include, for example, an IBM eServer pSeries system, a product of International Business Machines Corporation of Armonk, N.Y., running the Advanced Interactive Executive (AIX) operating system or LINUX operating system.

FIGS. 3-6 are flow charts and/or functional block diagrams illustrating various hardware/software components and/or methods by which the illustrative embodiments of the invention can be performed. Although components and/or methods shown in FIGS. 3-6 may be described with reference to components shown in FIGS. 1-2, it should be understood that this is merely for convenience and alternative components and/or configurations thereof can be employed when implementing the various methods. Portions of the methods may be completed by video data processing component 270 executing within data processing system 200 (FIG. 2) and controlling specific operations of/on data processing system 200, and the methods may be described from the perspective of either/both video data processing component 270 and data processing system 200.

Figures 3, 4:
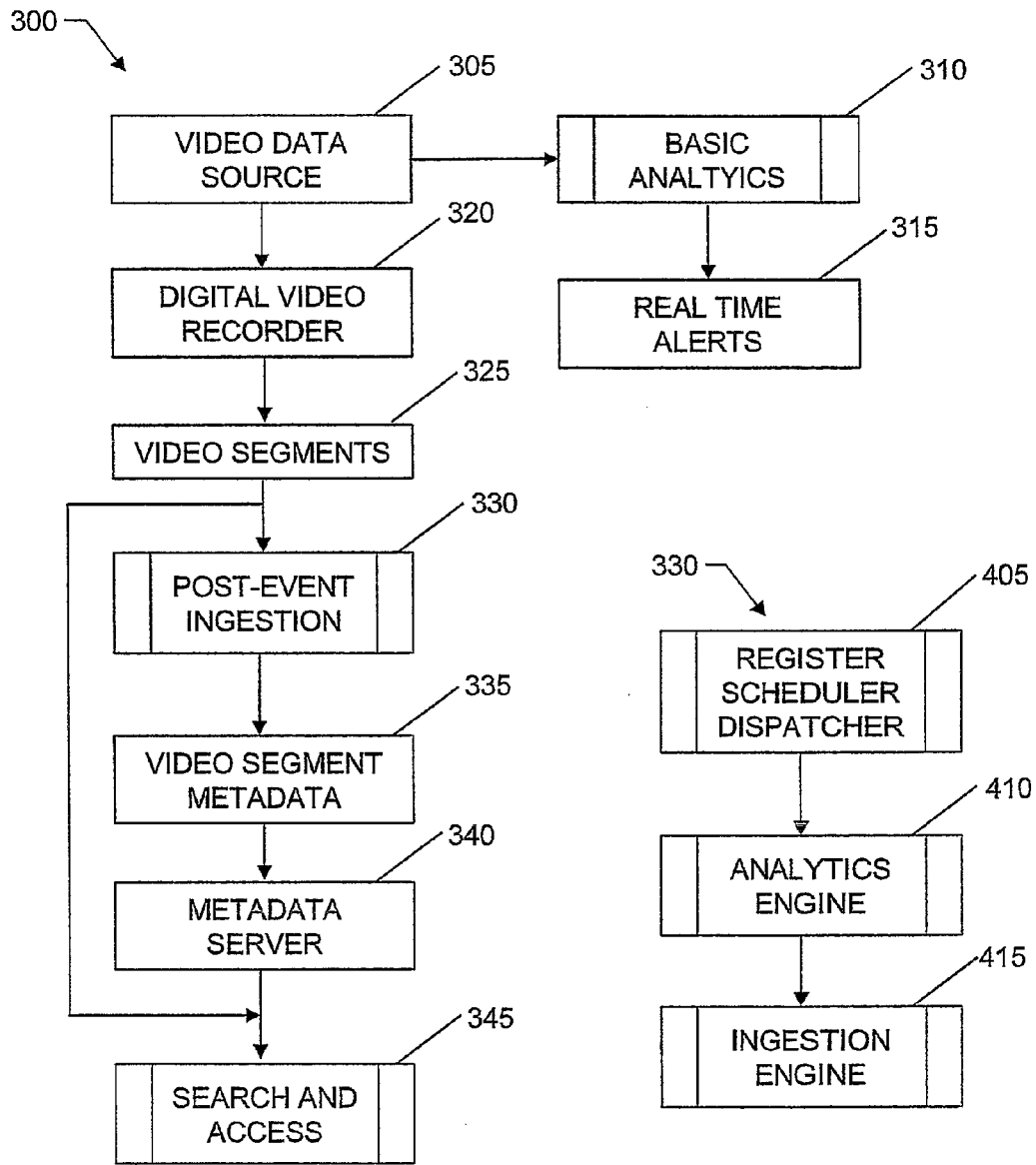
FIG. 3 is a block diagram of a video processing application that can be used with the data processing system of FIG. 2.
FIG. 4 is a block diagram of video processing components that can be used with the video processing application of FIG. 3.

Referencing FIGS. 3-4 now, in one embodiment, a video processing application 300 receives video data from a video data source 305 in communication with a basic analytics component 310. Video data source 305 can be any video capture device configured to capture raw video data, or configured to supply video signals. Basic analytics component 310 is configured to apply an analytics profile to the video data received from video data source 305. The basic analytics component 310 outputs metadata generated based on the video data received form video data source 305. This metadata output is provided to real time alerts component 315, which is configured to evaluate the metadata and issue alerts according to some desired criteria. Video data source 305 is also in communication with digital video recorder 320, which in some embodiments is a digital video data encoding device used to process raw video data and compress it according to one or more of various formats, such as video formats MPEG, MPEG2, MPEG3, MPEG4, MOV, H.261, H.262, H.264, etc. In some embodiments, basic analytics 310 is in communication digital video recorder 320, rather than being coupled to video data source 305.

In one configuration, digital video recorder 320 outputs video (that is, recorded/encoded digital video content), which is preferably in the form of separate video segments 325. That is, in some implementations, video data provided by video data source 305 is processed into recorded digital video and divided into separate video segments 325 by digital video recorder 320. The division of the video into video segments 325 can be performed according to any suitable, predetermined criteria including, for example, file size in bytes, time duration of segments, logical divisions, etc. Post-event ingestion component 330 receives video segments 325 and applies to them a registrar-scheduler-dispatcher (RSD) component 405, analytics engines 410, and ingestion engines 415, which component and engines are shown in FIG. 4 and described further below. The output of post-event ingestion component 330 is video segment metadata 335 that is provided to metadata server 340. Search and access component 345 is configured to allow a user to access and search the video segments 325 employing the contents of metadata server 340.

In one embodiment, post-event ingestion component 330 includes RSD component 405 configured to perform several functions. RSD component 405 serves as registrar, scheduler, and dispatcher. RSD component 405 provides, manages, and/or queries a queue or registry of analytics engines and ingestion engines available in a grid computing environment or a massively parallel computing environment, for example. In one embodiment, RSD component 405 queries a registry configured so that analytics engines and ingestion engines register themselves as they become available. RSD component 405 is further configured to schedule each video segment for processing by an available analytics engine 410 and an available ingestion engine 415. In one embodiment, RSD component 405 additionally indexes each video segment with a time stamp having an appropriate time offset. That is, RSD component 405 accounts for the time offset of a video segment against the recorded video, which itself has a time offset against the real time at which the video was recorded. For example, in one implementation, RSD component 405 sends time offsets that are based at least in part on the recorded time of the video segment to be processed and the time at which the video processing begins (the latter time being pre-scheduled, in some implementations). RSD component 405 is also configured to dispatch the video segments to the analytics engines 410 and ingestion engines 415. In one embodiment, RSD component 405 commands an available analytics engine 410 to process a specific video segment 325. RSD component 405 then commands an available ingestion engine 415 to process the specific video segment 325. In other embodiments, an analytics engine 410 and an ingestion engine 415 are registered as a pair, and RSD component 405 commands said pair to process a specific video segment 325.

In its scheduling function, RSD component 405 can be configured to perform load balancing to enhance the performance and activity levels on all available analytics engines 410 and ingestion engines 415. RSD component 405 can perform resource scheduling based on several known techniques, one such technique being grid computing. In one embodiment, RSD component 405 is configured so that both analytics engines 410 and ingestion engines 415 are packaged as grid clients, allowing video processing loads to be distributed to analytics engines 410 and ingestion engines 415 as they become available. Grid computing techniques also can use the packaging of client software in atomic units, a configuration which also enhances an on-demand, post-event service.

It should be noted that video processing application 300 facilitates resource allocation that is sized based on routine requirements, while post-event searches can be handled on-demand, for example, so that a user pays only for the resources consumed at the specified service level. The video processing application 300 completes a post-event processing of video more rapidly than current technologies are capable of performing the same task. Since response time can be critical in certain post-event situations, the value of faster video processing can be significant.

Figure 5:
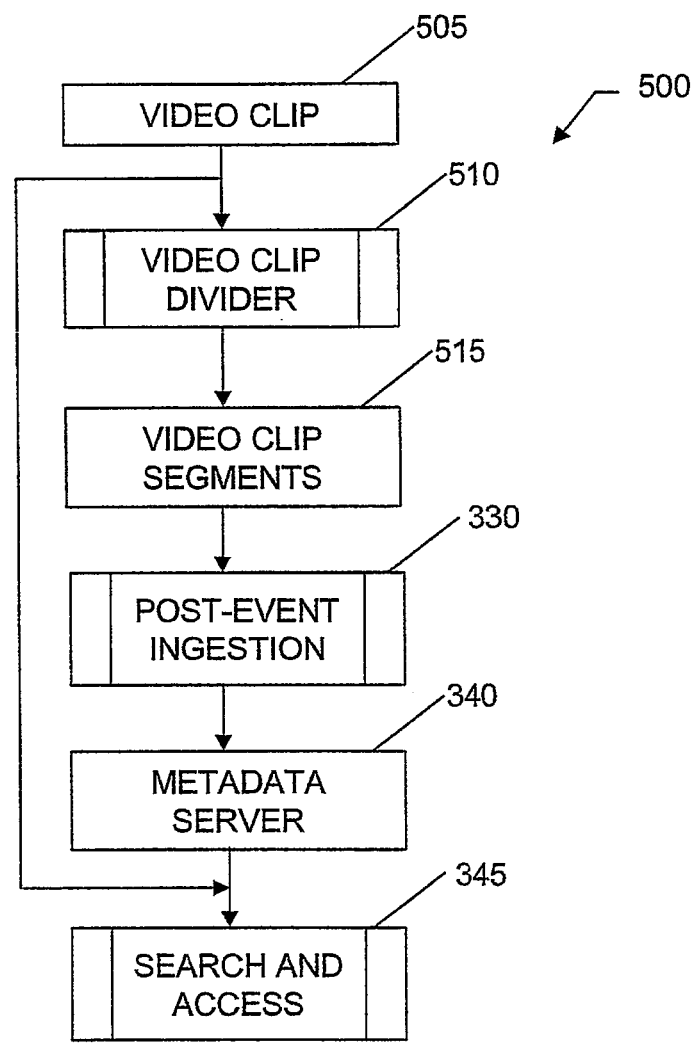
FIG. 5 is another embodiment of video processing application that can be used with the data processing system of FIG. 2.

Referencing FIG. 5 now, there is illustrated an alternative video processing application 500 configured to process video clip 505. In one embodiment, video clip 505 is a segment of a compressed master video file. Video clip divider 510 divides video clip 505 using keyframes, which are frequently used in digital video compression algorithms. Video clip divider 505 divides video clip 505 into multiple logical clips, video clip segments 515, using the keyframes as separation points. The time offset of each keyframe from the start of video clip 505 allows all of the video clip segments 515 to be in synchronization relative to the master video file. Video processing application 500 can additionally be configured with post-event ingestion 330, metadata server 340, and search and access 345 components, which are described above with reference to FIGS. 3-4. It should be noted that, when compared to video processing application 300 of FIGS. 3-4, video processing application 500 is configured to add another level of parallelism in processing video by dividing single video clips 505 into smaller video clip segments 515.

Figure 6:
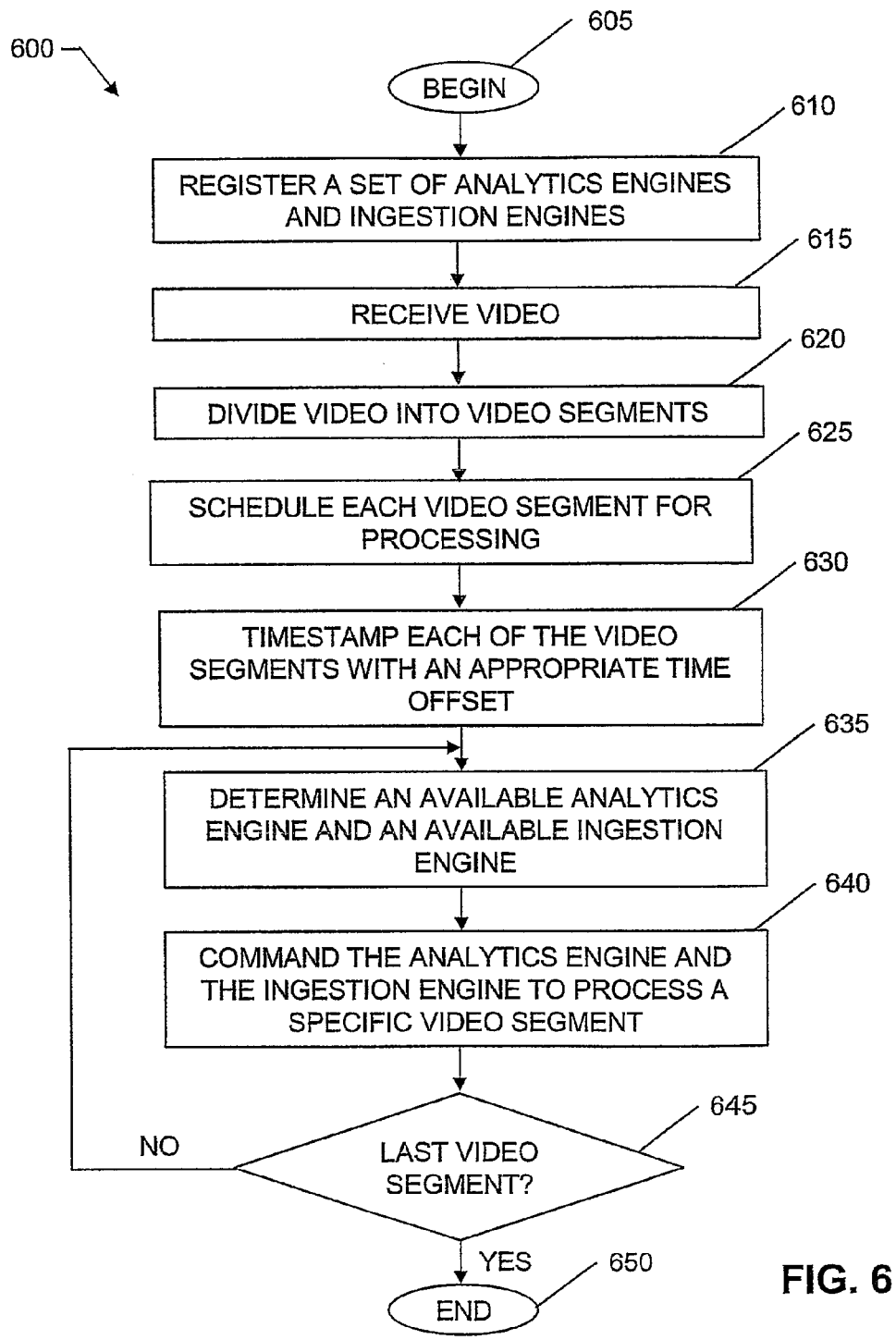
FIG. 6 is a flowchart of a video processing method that can be used with the systems and/or applications of FIGS. 1-5.

Referencing FIG. 6 now, there is depicted a flow chart illustrating an exemplary method for carrying out various aspects of the invention. Video processing method 600 begins at an initiator block 605. At a block 610, a set of analytics engines and ingestion engines are registered. In other implementations, a registry of analytics and ingestion engines is provided or made available at block 610. In such a case, at block 610 information regarding a location of the registry is received. At a block 615, recorded digital video ("video") is received. In some embodiments, the video is whole master file; in other embodiments, the video is a video clip (that is, a portion of the master file). The video is divided into smaller video segments at a block 620.

As described above with reference to the embodiment of FIG. 5, when a video clip is received, the video clip is divided into smaller video clip divisions (which divisions can be based on, for example, keyframes). In some implementations of the video processing method 600, division of the video are placed within periods of inactivity in the video. Such a method of division facilitates a greater dynamic distribution of video segments based on, for example, length and activity. This approach to division of the video also aids distribution of video segments based on the expected load to analyze them and the bandwidth of the respective video processing nodes. Division during a period of inactivity allows analytics engines to track correctly object motion and any other behavior that is persistent across a time frame. It is preferable to avoid dividing in the middle of an activity because the analytics engines would then treat a single activity as two separate events with no continuity between the video segments. Hence, this approach to division of the video ensures that all activity is analyzed contiguously.

Passing to block 625, each of the video segments is scheduled for processing at a predetermined time or as analytics engines and ingestions engines become available. At a block 630 each of the video segments is provided with a timestamp associated with an appropriate time offset so that the analytics engines generate metadata that is correctly time stamped. As previously discussed with reference to FIGS. 3-4, various implementation of the invention account for the time offset of a video segment against the recorded video, which itself has a time offset against the real time at which the video was recorded. By way of example, time offsets can be based at least in part on the time at which the video was recorded and the time that the analytics engines begin processing the video segment.

At block 635 it is determined which analytics engine and ingestion engine are available for processing the video segment. In one implementation, a registry of analytics engines and ingestion engines is queried to identify the available engines. In some implementations, the analytics engine and the ingestion engine selected are part of processing nodes 130-135 (see FIG. 1) in a massively parallel computing environment, or clients in a grid computing environment. Proceeding to a block 640, the selected analytics engine and ingestion engine are commanded to process the video segment. At a decision block 645, it is determined whether the last video segment has been processed. If there are additional video segments to be processed, the video processing method 600 continues at block 635. If the video processing method 600 has commanded processing of the last video segment, the video processing method 600 ends at a block 650.

In the flow charts and/or functional block diagrams above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a networked video processing system, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method of processing recorded digital video content, the method comprising:
in response to receiving recorded digital video content, a data processing system dividing the recorded digital video content into a plurality of video segments each including multiple frames, wherein the dividing includes dividing the recorded digital video content only at points of inactivity in the recorded digital video content;
the data processing system time stamping each of the plurality of video segments with a time offset; and
the data processing system directing video processing of the plurality of video segments in parallel by multiple analytics engines and multiple ingestion engines, wherein directing video processing includes dispatching each of the plurality of video segments for parallel processing by a respective engine pair including one of the multiple analytics engines and one of the multiple ingestion engines, wherein each of the multiple analytics engines analyzes one or more of the plurality of video segments and generates metadata describing the one or more of the plurality of video segments, and wherein each of the multiple ingestion engines ingests one or more video segments, uses at least in part the time offset to index the generated metadata, and stores the indexed metadata in a database to enable subsequent search for a desired video segment among the plurality of video segments by reference to the indexed metadata.

2. The method of claim 1, further comprising registering the multiple analytics engines and multiple ingestion engines with the data processing system prior to video processing of the plurality of video segments.

3. The method of claim 2, wherein:
each of the plurality of video segments includes a plurality of keyframes; and
dividing the recorded digital video content into a plurality of video segments includes dividing the recorded digital video content based at least in part on the keyframes.

4. The method of claim 1, wherein each time offset is indicative of a temporal relationship between an associated one of the plurality of video segments and said recorded digital video content.

5. The method of claim 1, wherein each time offset indicates an interval from a real time at which the recorded digital video content was recorded to a time of processing an associated one of the plurality of video segments.

6. The method of claim 1, and further comprising:
allocating resources including the multiple analytics engines and multiple ingestion engines to perform video processing on-demand in response to receipt of a video processing request from a client device; and
after the video processing, releasing some of the resources for reallocation and retaining allocation of others of the resources to support search and access of the desired video segment.

7. The method of claim 6, and further comprising thereafter performing search and access of the desired video segments utilizing the others of the resources.

8. The method of claim 1, wherein the time stamping includes time stamping the plurality of video segments prior to video processing of the plurality of video segments by the multiple analytics engines and multiple ingestion engines.

9. A data processing system for processing digital recorded video, the system comprising:
a processing unit implemented in hardware;
data storage coupled to the processing unit; and
program code stored in the data storage and executable by the processing unit, wherein the program code includes:
a video divider that receives digital video content and divides said digital video content into a plurality of video segments each including multiple frames, wherein the dividing includes dividing the digital video content only at points of inactivity in the recorded digital video content;
a component that directs video processing of the plurality of video segments in parallel by multiple analytics engines and by multiple ingestion engines, wherein the component directs video processing by dispatching each of the plurality of video segments for parallel processing by a respective engine pair including one of the multiple analytics engines and one of the multiple ingestion engines, wherein each of the multiple analytics engines analyzes one or more of the plurality of video segments and generates metadata describing the one or more of the plurality of video segments, and wherein each of the multiple ingestion engines receives the generated metadata, indexes the metadata, and stores the indexed metadata in a database to enable subsequent search for a desired video segment among the plurality of video segments by reference to the indexed metadata; and
a post-event ingestion component configured to determine a respective time offset for each of the plurality of video segments and to provide said time offset to an appropriate one of the multiple analytics engines so that the metadata generated is suitably indexed by one of the multiple ingestion engines based at least in part on the time offset.

10. The data processing system of claim 9, wherein the video divider comprises a digital video recorder.

11. The data processing system of claim 9, the program code further comprising instructions that, when executed, register the available analytics engines and ingestion engines with the data processing system prior to video processing of the plurality of video segments.

12. The data processing system of claim 9, wherein each time offset is indicative of a temporal relationship between an associated one of the plurality of video segments and said digital video content.

13. The data processing system of claim 9, wherein:
said video content comprises a plurality of keyframes; and
the video divider divides said video content based at least in part on said plurality of keyframes.

14. A computer readable storage device storing program code that, when executed, cause a computing device to process recorded digital video content, wherein the program code includes:
instructions that, when executed, cause the computing device to divide the digital video content into a plurality of video segments only at points of inactivity in the recorded digital video content;
instructions that, when executed, cause the computing device to assign a respective time offset to each of the plurality of video segments;
instructions that, when executed, cause the computing device to direct video processing of the plurality of video segments in parallel by multiple analytics engines and multiple ingestion engines, wherein the instructions cause the computing device to direct video processing by dispatching each of the plurality of video segments for parallel processing by a respective engine pair including one of the multiple analytics engines and one of the multiple ingestion engines, wherein each of the multiple analytics engines analyzes one or more of the plurality of video segments and generates metadata describing the one or more of the plurality of video segments, and wherein each of the multiple ingestion engines receives the generated metadata, indexes the metadata, and stores the indexed metadata in a database to enable subsequent search for a desired video segment among the plurality of video segments by reference to the indexed metadata; and
instructions that, when executed, cause the computing device to provide each time offset to an appropriate one of the multiple analytics engine and to the appropriate one of the ingestion engines so that the metadata generated is indexed based at least in part on the time offset.

15. The computer readable storage device of claim 14, wherein the instructions further comprises instructions that, when executed, cause the computing device to register the multiple analytics engines and multiple ingestion engines prior to video processing of the plurality of video segments.

16. The computer readable storage device of claim 14, wherein:
each of the plurality of video segments includes a plurality of keyframes; and
the instructions that cause the computing device to divide the digital video content into a plurality of video segments comprise instructions that cause the computing device to divide the digital video content based at least in part on the keyframes.

17. The computer readable storage device of claim 14, wherein each time offset is indicative of a temporal relationship between an associated one of the plurality of video segments and said digital video content.

18. The computer readable storage device of claim 14, wherein each time offset indicates an interval from a real time at which the recorded digital video content was recorded to a time of processing an associated one of the plurality of video segments.

19. The computer readable storage device of claim 14, and further comprising:
instructions that, when executed, cause the computing device to allocate resources including the multiple analytics engines and multiple ingestion engines to perform video processing on-demand in response to receipt of a video processing request from a client device; and
instructions that, when executed, cause the computing device to release some of the resources for reallocation and retain allocation of others of the resources to support search and access of the desired video segment.

20. The computer readable storage device of claim 19, and further comprising instructions that, when executed, cause the computing device to thereafter performing search and access of the desired video segments utilizing the others of the resources.

21. The computer readable storage device of claim 14, wherein the instructions that cause the computing device to assign a respective time offset comprise instructions that, when executed, cause the computing device to assign a respective time offset to each of the plurality of video segments prior to video processing of the plurality of video segments by the multiple analytics engines and multiple ingestion engines.

* * * * *